United States Patent [19]

Kawamura et al.

[11] Patent Number: 5,072,995
[45] Date of Patent: Dec. 17, 1991

[54] SLIP CONTROL MECHANISM OF A CAR

[75] Inventors: Makoto Kawamura; Haruki Okazaki; Fumio Kageyama; Kazutoshi Nobumoto, all of Hiroshima; Toshiaki Tsuyama, Higashi-Hiroshima, all of Japan

[73] Assignee: Mazda Motor Corporation, Hiroshima, Japan

[21] Appl. No.: 604,442

[22] Filed: Oct. 29, 1990

[30] Foreign Application Priority Data

Oct. 30, 1989 [JP] Japan .................................. 1-282273

[51] Int. Cl.$^5$ .......................... B60T 8/58; B60K 31/00; B60K 28/16
[52] U.S. Cl. ..................................... 303/100; 180/197; 188/181 R; 303/119 R; 303/69; 303/113 TB
[58] Field of Search ................... 180/197; 303/100, 96, 303/114, 116, 119, 68, 69, 111; 364/426.03, 426.02, 424.1, 431.07; 192/4 R, 4 A, 1.21; 188/181 A, 181 R

[56] References Cited

U.S. PATENT DOCUMENTS 4,643,485 2/1987 Leiber ..................... 303/96
4,976,330 12/1990 Matsumoto ................. 303/100 X
5,000,281 3/1991 Nobumoto et al. ............ 303/100 X

FOREIGN PATENT DOCUMENTS 60-179363 9/1985 Japan .

Primary Examiner—Douglas C. Butler
Attorney, Agent, or Firm—Fleit, Jacobson, Cohn, Price, Holman & Stern

[57] ABSTRACT

A slip control mechanism of a car has a hydraulic booster for driving a master cylinder for providing hydraulic pressure to a first brake provided for each driven wheel, a second brake provided for each driving wheel, a slip detection device for detecting the slip of driving wheels, a slip control device for operating the second brake, based on signals from the slip detecting device, by using the operating oil of the hydraulic booster as operating oil of the second brake so as to reduce the slip of the driving wheels, the control device comprising a pressure control valve for controlling hydraulic pressure of the operating oil of the second brake, including a pressure reducing valve for reducing the hydraulic pressure of the operating oil of the second brake, detection device for detecting completion of the slip control by the operation of the second brake, and a release device for opening the pressure reducing valve for a predetermined time so as to release the operating oil of the second brake on the occasion of the completion of the slip control by the operation of the second brake.

7 Claims, 8 Drawing Sheets

SLIP CONTROL MECHANISM OF A CAR

BACKGROUND OF THE INVENTION

1. Field of the Invention

The present invention relates to a slip control mechanism of a car.

2. Description of the Prior Art

There has previously been known a slip control system used as one of the electrical control systems of a car. The slip control system assures stability, maneuverability and high acceleration when starting a car and during running of a car. When driving wheels excessively slip due to excessive pressure applied to an accelerator by a driver, the performance of the car as regards, for example, stability and maneuverability, is reduced and acceleration also decreases. In the slip control system, acceleration of wheel rotation, speed or acceleration of the car, etc. are calculated by means of an electrical control mechanism based on signals from vehicle speed sensors connected to the wheels of the car, and if the excessive slip of the driving wheels is detected, the driving force transmitted to the driving wheels is restricted so as to restrict the excessive slip.

There are two ways of restricting the driving force transmitted to the driving wheels against the pressure applied to the accelerator by the driver. One way is to restrict the output of the engine, the other is to have the brake applied to the slipping wheel regardless of the operation by the driver. One of the slip control mechanisms which adopts the latter way is the control mechanism disclosed in Japanese Patent Laid-open Publication No. 60-179363. In this slip control mechanism, the hydraulic pressure of operating oil of an amplifying means or a hydraulic booster is used as the hydraulic pressure for braking so as to carry out the brake control for controlling the slip.

But, the above slip control mechanism includes the following problem. That is, when the slip control is stopped just after the hydraulic pressure of the operating oil of the hydraulic booster is supplied to the cylinders of the brakes of the driving wheels, the hydraulic pressure in the cylinders of the brakes of the driving wheels does not rapidly drop so that the release of the brakes is delayed, as the operation oil supplied to the cylinders of the brakes returns to a reservoir through orifices in the hydraulic booster. As a result, there is a decrease in the acceleration of the car.

SUMMARY OF THE INVENTION

It is therefore the object of the present invention to provide a slip control mechanism adapted to carry out the brake control for controlling the slip by using the hydraulic pressure of the operating oil of the hydraulic booster as the hydraulic pressure for braking, said slip control mechanism having means for preventing the delay of the release of the brake when the slip control is stopped.

In accordance with the present invention, there is provided a slip control mechanism of a car comprising hydraulic booster means for driving master cylinder means for providing hydraulic pressure to first brake means provided for each driven wheel, second brake means provided for each driving wheel, slip detection means for detecting slip of the driving wheels, slip control means for operating the second brake means, based on signals from the slip detecting means, by using operating oil of hydraulic booster means as operating oil of the second brake means so as to reduce the slip of the driving wheels, said control means comprising pressure control valve means for controlling hydraulic pressure of the operating oil of the second brake means, including pressure reducing valve means for reducing the hydraulic pressure of the operating oil of the second brake means, detection means for detecting completion of the slip control by the operation of the second brake means, and release means for opening the pressure reducing valve means for a predetermined time so as to release the operating oil of the second brake means on the occasion of the completion of the slip control by the operation of the second brake means.

According to the above features, when the slip control by the operation of the second brake means is completed, the pressure reducing valve means are opened for a predetermined time. Thus, the second brake means are released immediately.

According to a preferred embodiment of the present invention, the pressure reducing valve means comprises outlet valve means of an antilock brake system of the car.

According to another preferred embodiment of the present invention, the detecting means for detecting completion of the slip control comprises a brake switch which is turned on when a brake pedal is pushed.

According to still another preferred embodiment of the present invention, the release means has braking force detecting means for detecting braking force acting on the driving wheels, and has time control means for allowing said predetermined time having a linear relationship to the magnitude of the braking force acting on the driving wheels.

According to another preferred embodiment of the present invention, the pressure control valve means has closing valve means for restricting the supply of the operating oil to the second braking means, and the pressure reducing valve means is disposed between the closing valve means and the second brake means.

According to still another preferred embodiment of the present invention, the pressure control valve means is provided for each driving wheel;

In a preferable aspect of the present invention, there is provided a slip control mechanism of a car comprising hydraulic booster means for driving master cylinder means for providing hydraulic pressure to first brake means provided for each driven wheel, second brake means provided to each driving wheel, slip detection means for detecting slip of the driving wheels, first slip control means for operating the second brake means, based on signals from the slip detecting means, by using the operating oil of the hydraulic booster means as operating oil of the second brake means so as to reduce the slip of the driving wheels, said control means comprising pressure control valve means for controlling hydraulic pressure of the operating oil of the second brake means, including pressure reducing valve means for reducing the hydraulic pressure of the operating oil of the second brake means, detection means for detecting completion of the slip control by the operation of the second brake means, release means for opening the pressure reducing valve means for a predetermined time so as to release the operating oil of the second brake means on the occasion of the completion of the slip control by the operation of the second brake means, and second slip control means for decreasing output torque of the engine of the car, based on signals from the slip detecting means, by decreasing throttle opening of the engine so as to reduce the slip of the driving wheels.

DESCRIPTION OF THE PREFERRED EMBODIMENTS

Figure 1:
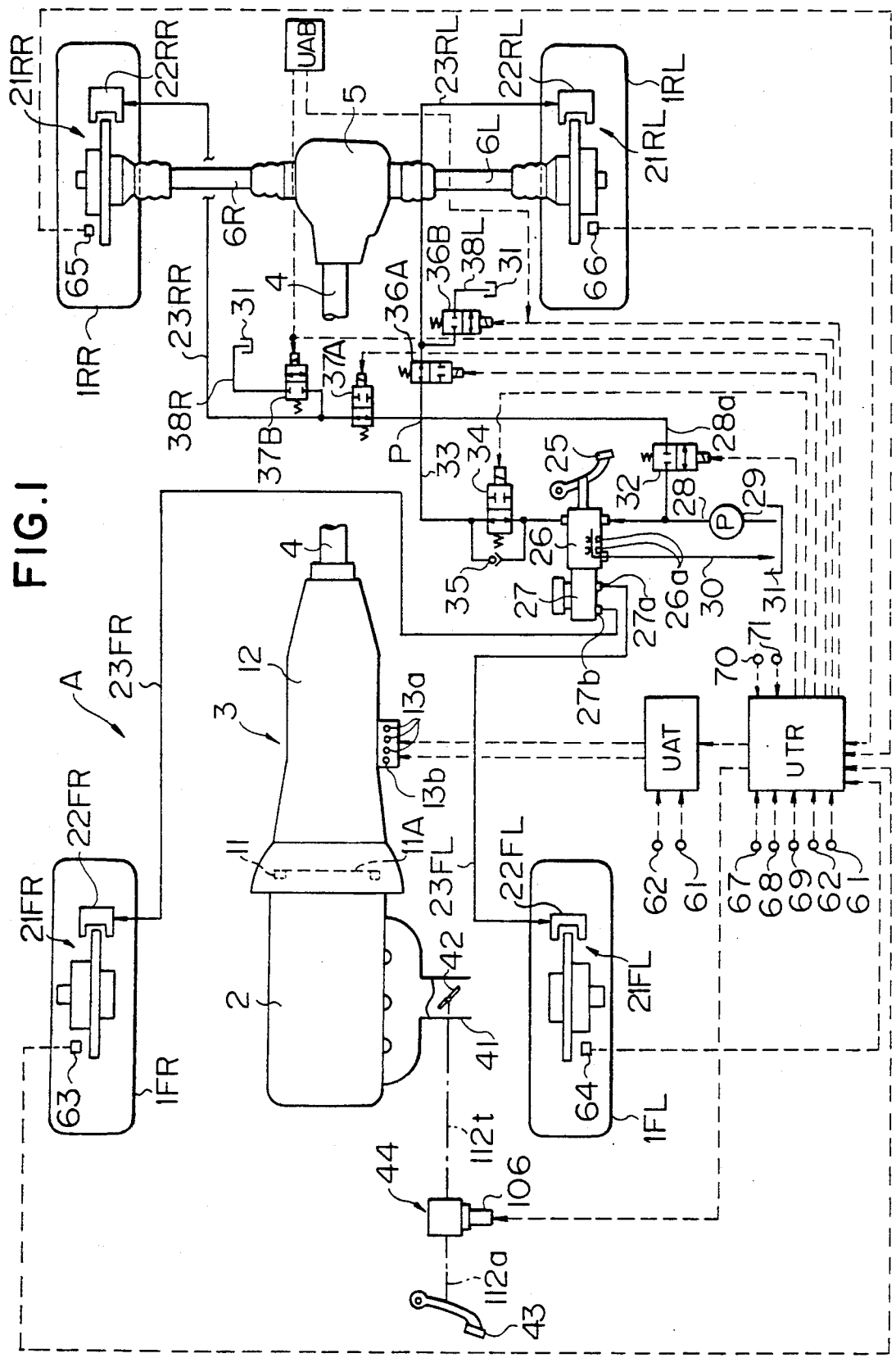
FIG. 1 is a general diagram of a slip control mechanism in accordance with the present invention.

Referring to FIG. 1, there is shown a car A having a slip control mechanism in accordance with an embodiment of the present invention. The car A has left and right front wheels 1FL, 1FR for driven wheels, and left and right rear wheels 1RL, 1RR for driving wheels. Driving torque generated by an engine 2 disposed in the front portion of the car A is transmitted to the left rear wheel 1RL through an automatic transmission 3, a propeller shaft 4, a differential 5 and a left rear axle 6L, and to the right rear wheel 1RR through an automatic transmission 3, a propeller shaft 4, a differential 5 and a right rear axle 6R.

Construction of the Automatic Transmission

The automatic transmission 3 comprises a torque converter 11 and a multiple-stage transmission gear mechanism 12. Transmission control is carried out by changing combinations of magnetization and demagnetization of a plurality of solenoids 13a which are incorporated in a hydraulic control circuit for the transmission gear mechanism 12. The torque converter 11 has a lockup clutch 11A operated by hydraulic pressure. Connection and disconnection of the lockup clutch 11A is carried out by changing magnetization and demagnetization of a solenoid 13b which is incorporated in a hydraulic control circuit for the lockup clutch 11A.

The solenoids 13a and 13b are controlled by a control unit UAT for the automatic transmission 3. The control unit UAT is, as is already known, provided with transmission diagrams and lockup diagrams so as to carry out transmission control and lockup control based on the diagrams. To carry out this control, the control unit UAT receives a throttle opening signal, vehicle speed signal (rotation signal of the propeller shaft 4, in this embodiment) respectively from sensors 61, 62.

Construction of Control Mechanism of Hydraulic Pressure for Brake

Each wheel 1FR~1RR is provided with brakes 21FR~21RR respectively. Each caliper (brake cylinder) 22FR~22RR of each brake 21FR~21RR is supplied with hydraulic pressure for the brakes.

The hydraulic pressure is supplied to each brake 21FR~21RR through a mechanism as follows. First, the pressure applied to a brake pedal 25 is increased by amplifying means or a hydraulic booster 26, then transmitted to a tandem type master cylinder 27. The hydraulic pressure transmitted to the master cylinder 27 is then transmitted to the brake 21FL for the front left wheel through conduit 23FL connected to a first outlet 27a of the master cylinder 27, and to the brake 21FR for the front right wheel through conduit 23FR connected to a second outlet 27b of the master cylinder 27.

The hydraulic booster 26 is supplied with the hydraulic pressure from a pump 29 through a circuit 28, and then the residual operating liquid is returned to a reservoir 31 through a plurality of orifices 26a disposed in the hydraulic booster 26, and a return conduit 30. A branch conduit 28a is connected to the conduit 28, and is provided with an electromagnetic closing valve 32. A conduit 33 is connected to the hydraulic booster 26, and is provided with an electromagnetic closing valve 34 and a check valve 35 disposed parallel to the closing valve 34.

The branch conduit 28a and the conduit 33 communicate with each other at a communicating point p and the communicating point P communicates with conduits 23RL, 23RR for the rear left and right brakes 21RL, 21RR. The conduits 23RL, 23RR are respectively provided with electromagnetic closing valves 36A, 37A. The conduits 23RL, 23RR are respectively provided with relief conduits 38L, 38R at their position downstream from the electromagnetic closing valves 36A, 37A. The relief conduits 38L, 38R are respectively provided with electromagnetic closing valves 36B, 37B which operate as outlet valves of the antilock brake system (ABS) under a control unit UAB.

The above mentioned valves 32, 34, 36A, 37A, 36B and 37B are controlled by a control unit UTR for slip control. That is, when the slip control is not carried out, the valves 32, 36B, 37B are closed and the valves 34, 36A, 37A are opened. Thus, when pressure is applied to the brake pedal 25, the front brakes 21FR, 21FL are supplied with hydraulic pressure through the master cylinder 27, and the rear brakes 21RR, 21RL are supplied with the hydraulic pressure of the operating oil of the hydraulic booster 26 through the conduit 33.

As described later, when the slip between the driving wheels or the rear wheels 1RR, 1RL and the road surface becomes large and the slip control is carried out, the valve 34 is closed, while the valve 32 is opened. Then, maintaining, increasing and decreasing of the hydraulic pressure for the brake is carried out by the duty control of the valves 36A, 37A, 36B and 37B. More specifically, on the basis of the valve 32 being opened, the hydraulic pressure for the brake is maintained when the valves 36A, 37A, 36B and 37B are all closed, is increased when valves 36A, 37A are opened and while valves 36B and 37B are closed, and is decreased when valves 36A, 37A are closed and while valves 36B and 37B are opened. The hydraulic pressure in the branch conduit 28a is kept from acting on the brake pedal 25 as a counter force by means of the check valve 35.

When pressure is applied to the brake pedal 25 during the operation of the aforementioned slip control, the hydraulic pressure of the operating oil of the hydraulic booster 26 respondant to the pressure applied to the brake pedal 25 is supplied to the rear brakes 21RR, 21Rl as the hydraulic pressure for the brake through the check valve 35.

Construction of a Mechanism for Controlling Engine Torque

The slip control unit UTR decreases the output torque of the engine 2 as well as applies the braking force to the driving wheels 1RL, 1RR so as to decrease the torque supplied to the driving wheels 1RL, 1RR. To this end, a mechanism 44 for controlling the degree of opening of a throttle valve, hereinafter called a throttle opening control mechanism 44, is provided in a connecting mechanism between an accelerator 43 and a throttle valve 42 disposed in an intake passage 41 of the engine 2.

The throttle opening control mechanism 44 will be described hereinafter with reference to FIGS. 2a~2d. Members 112, 113 and 114 are levers slidable to the left and to the right in FIGS. 2a~2d. The lever 112 is connected to the accelerator 43 through an acceleration wire 112a. The lever 113 is biased to the right, the direction for closing the throttle valve 42, by a return spring 121 as well as is connected to the throttle valve 42 through a throttle wire 112t.

The lever 114 has an abutting portion 114a for abutting on the right side of the lever 112 and an abutting portion 114b for abutting on the right side of the lever 113. Disposed between the lever 112 and the lever 114 is a spring 116 for biasing the abutting portion 114a to abut on the lever 112. In the same way, disposed between the lever 113 and the lever 114 is a spring 122 for biasing the abutting portion 114b to abut on the lever 113. The biasing force of the spring 116 is set larger than those of the spring 122 and the return spring 121.

The lever 112 is provided with an abutting portion 112b at its right end which restricts the rightward movement of the lever 113 relative to the lever 112 within a predetermined extent.

A lever 111 is disposed on the left of the lever 114. The lever 111 is adapted to be driven to the left and to the right by a motor 106, but leftward movement of the lever 111 is restricted within a predetermined extent by a stopper 123.

The throttle opening control mechanism 44 constructed as described above operates as follows.

Figure 2A:
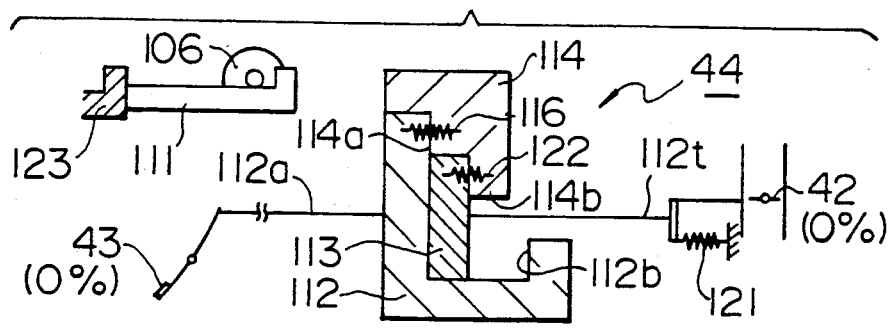
FIGS. 2a, 2b, 2c and 2d are schematic views showing the operation of a throttle opening control mechanism.
Figure 2B:
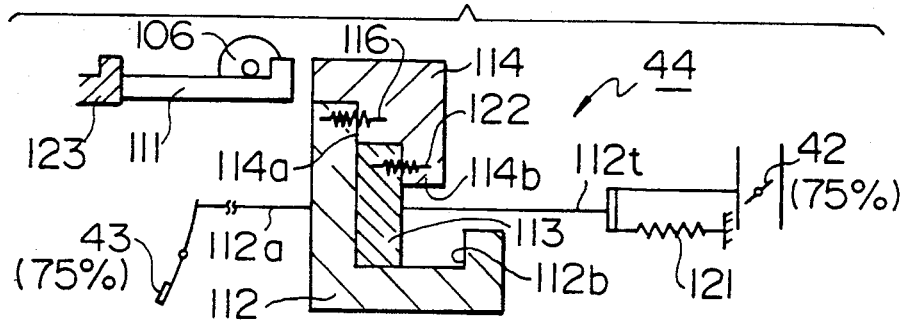

First, there is a condition wherein the lever 111 abuts against the stopper 123. In this condition, the levers 112, 113 and 114 are made integral under the biasing force of the springs 116 and 122 as shown in FIGS. 2a, 2b, so that the degree of opening of the throttle, hereinafter called a throttle opening, obtained is proportional to the degree of opening of the accelerator, hereinafter called an accelerator opening, that is, the throttle opening varies within a range of 0~100% while the accelerator opening varies within a range of 0~100%. FIG. 2a shows a condition wherein the throttle opening is 0%, that is the accelerator opening is 0% and FIG. 2b shows a condition wherein the throttle opening is 75%, that is the accelerator opening is 75%. In the condition of FIG. 2b, there remains a distance between the levers 111 and 114, which is necessary for making the throttle opening vary from 75% to 100%. Thus, the levers 111 and 114 abut against each other when the throttle opening becomes 100%, that is the accelerator opening becomes 100%.

Figure 2C:
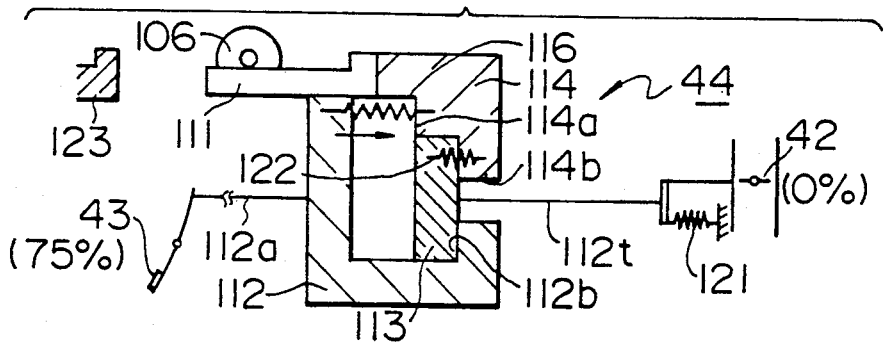
Figure 2D:
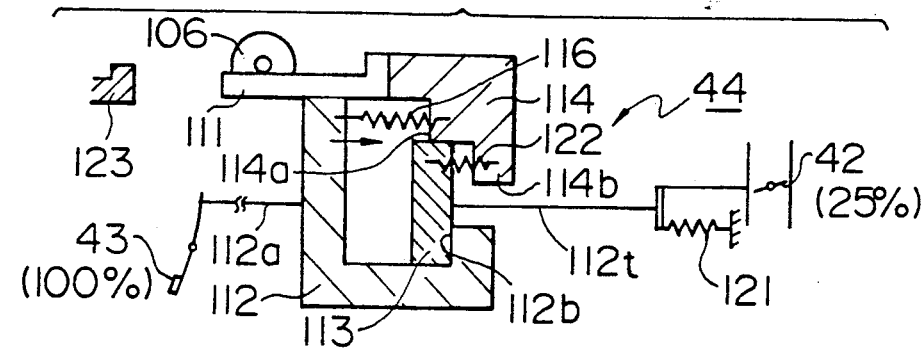

When the lever 111 is driven to the right by the motor 106 in the condition shown in FIG. 2b, the lever 114 is moved to the right against the spring 116 as shown in FIG. 2c. Thus, the throttle opening becomes small, while the accelerator opening remains as it is. In FIG. 2c, the throttle opening is 0%, that is the throttle is completely closed, while the accelerator opening is 75%. In this condition, the abutting portion 112b of the lever 112 abuts against the lever 113.

When the accelerator opening is made 100% in the condition shown in FIG. 2c, the lever 112 is moved to the left, and accordingly the lever 113 is moved to the left by the abutting portion 112b. Thus, the throttle opening changes from 0% shown in FIG. 2c to 25% shown in FIG. 2d.

As is clearly understood from the above description, even if the lever 111 becomes stuck in the condition shown in FIG. 2c, the throttle valve 42 can be opened to an opening of 25% by making the accelerator opening 100% so that the car 100 can be driven to a repair shop.

Outline of the Slip Control

In the slip control, the control unit UTR carries out brake control and engine control by controlling the motor 106 of the throttle opening control mechanism 44. The control unit UTR receives such signals as wheel rotation speed signals from sensors 63~66 for sensing the rotation speeds of the wheels, throttle opening signals from the sensor 61, vehicle speed signals from the sensor 62, accelerator opening signals from a sensor 67, rotation signals of the motor 106 from a sensor 68, steering angle signals from a sensor 69, mode signals from a manual switch 70 and brake signals from a brake switch 71 which is turned on when the brake pedal 25 is pushed.

Figure 3:
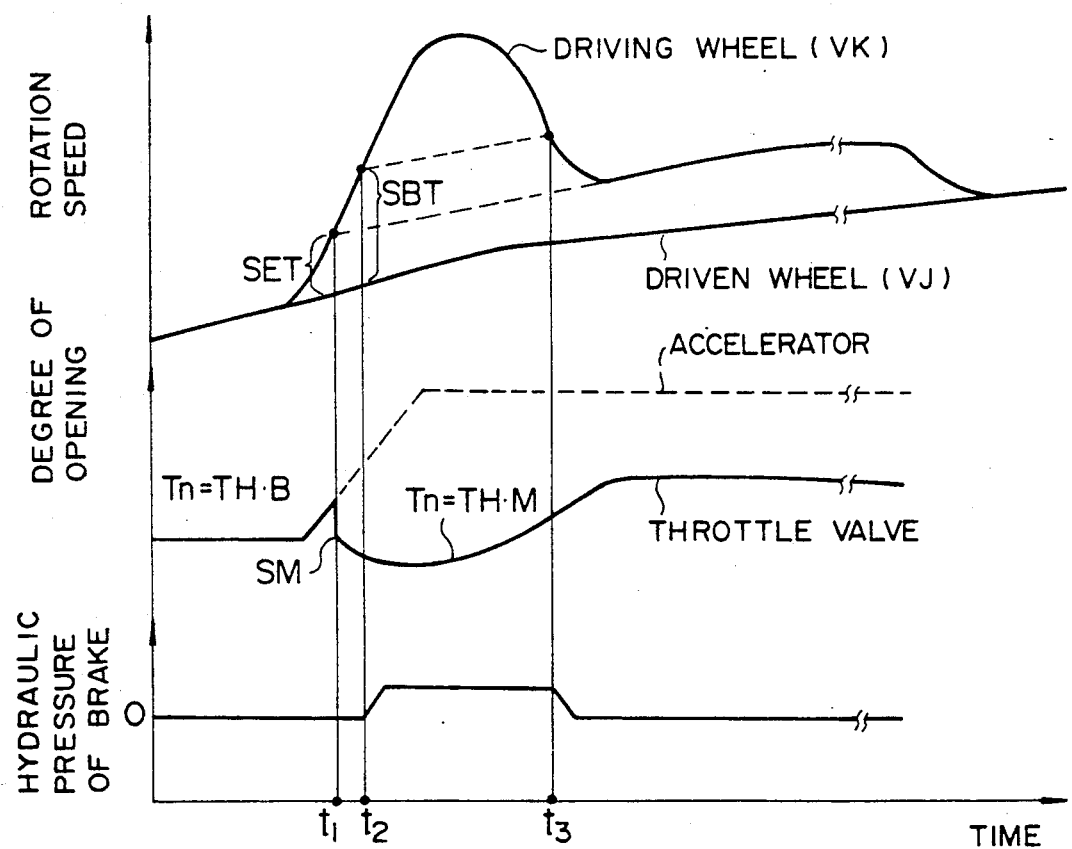
FIG. 3 is a time chart showing the outline of the slip control.

FIG. 3 shows the contents of the slip control comprising the engine control and the brake control. In FIG. 3, the set value of the slip used in the engine control is denoted by SET, and the set value of the slip used in the brake control is denoted by SBT. SBT is set larger than SET. In the above description, the term "slip" means the difference between the rotation speed of the driving wheel and that of the driven wheel.

Figure 9:
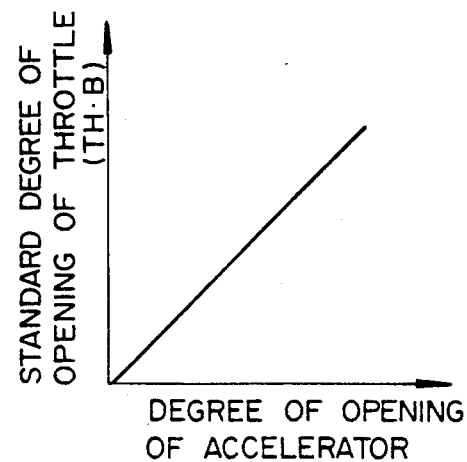
FIG. 9 is a standard throttle opening diagram.

Before the time $t_1$, the slip is small so that the throttle opening Tn is controlled depending on the accelerator opening, that is the throttle opening Tn is made TH·B, a standard throttle opening, in accordance with a standard throttle opening diagram shown in FIG. 9.

At the time $t_1$, when the slip becomes the set value SET, the slip control by engine control is started. First, the throttle opening Tn is reduced to a lower limit value SM at a stroke, then the throttle opening Tn is controlled by feedback so as to maintain the value of the slip to be SET. During this control, the throttle opening Tn is made TH·M, that is the throttle opening Tn is made to be the value controlled by the motor 106. As described above, TH·M is smaller than TH·B.

At the time $t_2$, when the slip becomes the set value SBT, the hydraulic pressure is supplied to the brakes 21RR, 21RL for the driving wheel 1RR, 1RL so that the slip control by both the engine control and the brake control is started. The hydraulic pressure supplied to the brakes 21RR, 21RL is controlled by feedback so as to maintain the value of the slip to be SBT.

At the time $t_3$, when the slip becomes smaller than the set value SBT, the hydraulic pressure supplied to the brakes 21RR, 21RL is reduced to zero, and the slip control by the brake control is finished. But, the slip control by the engine control is still continued until the accelerator opening is reduced to zero.

Detailed Description of the Slip Control

The slip control by the control unit UTR will be described hereinafter in detail with reference to the flowcharts shown in FIGS. 4~16. The reference letter P indicates a step of the flow of the control.

① Main Control

The contents of the main control will be described with reference to FIG. 4.

First, the signals from the sensors are input (P1).

Then, it is judged whether the control unit UTR has any trouble or not (P2). There are various kinds of troubles, such as wherein memory means incorporated in the control unit UTR are wrong, that is data can not be read out of ROM or the data read out of ROM are wrong, or wherein data can not be written into RAM or the data read out of RAM are wrong, etc..

If the control unit UTR has trouble, the slip control is stopped, then a trouble signal is output (P10~P11). That is, if the slip control is being carried out, the hydraulic pressure for the brake control is reduced to zero and the throttle opening is controlled depending on the accelerator opening, then the trouble signal is sent out by using lamps, buzzers, etc..

If the control unit UTR has no trouble, based on the wheel rotation speed signals from the sensors 63~66, the slip value S is calculated by subtracting the rotation speed of the driven wheel VJ from the rotation speed of the driving wheel VK (P3). In this calculation, the speed which is the average of the respective speeds of both of the driven wheels is used as the value VJ, and the larger driving wheel speed is used as the value VK for example, for the engine control. For the brake control, the same value VJ as for the engine control is used, but as for the value VK, when the braking foorce on both the right and left driving wheels are controlled independently from each other, the rotation speed of the right driving wheel is used as the value VK for the right driving wheel, while the rotation speed of the left driving wheel is used as the value VK for the left driving wheel.

Then, based on the accelerator opening signal from the sensor 67, it is judged whether the accelerator opening is zero or not (P4). If the accelerator opening is not zero, then it is judged whether the slip control is being carried out or not (P5). If the slip control is being carried out, then the slip control proceeds to the brake control (P8). If the slip control is not being carried out, then it is judged whether the slip value S of the driving wheel is larger than or equal to SET or not (P6). If the slip value S of the driving wheel is larger than or equal to SET, the lower limit of the throttle opening SM is set in a way to be described later (P7), then the slip control proceeds to a brake control to be described later (P8).

After the brake control is carried out, an engine control to be described later is carried out (P9).

If the accelerator opening is zero, the slip control is ended (P12).

② Brake Control

Figure 5:
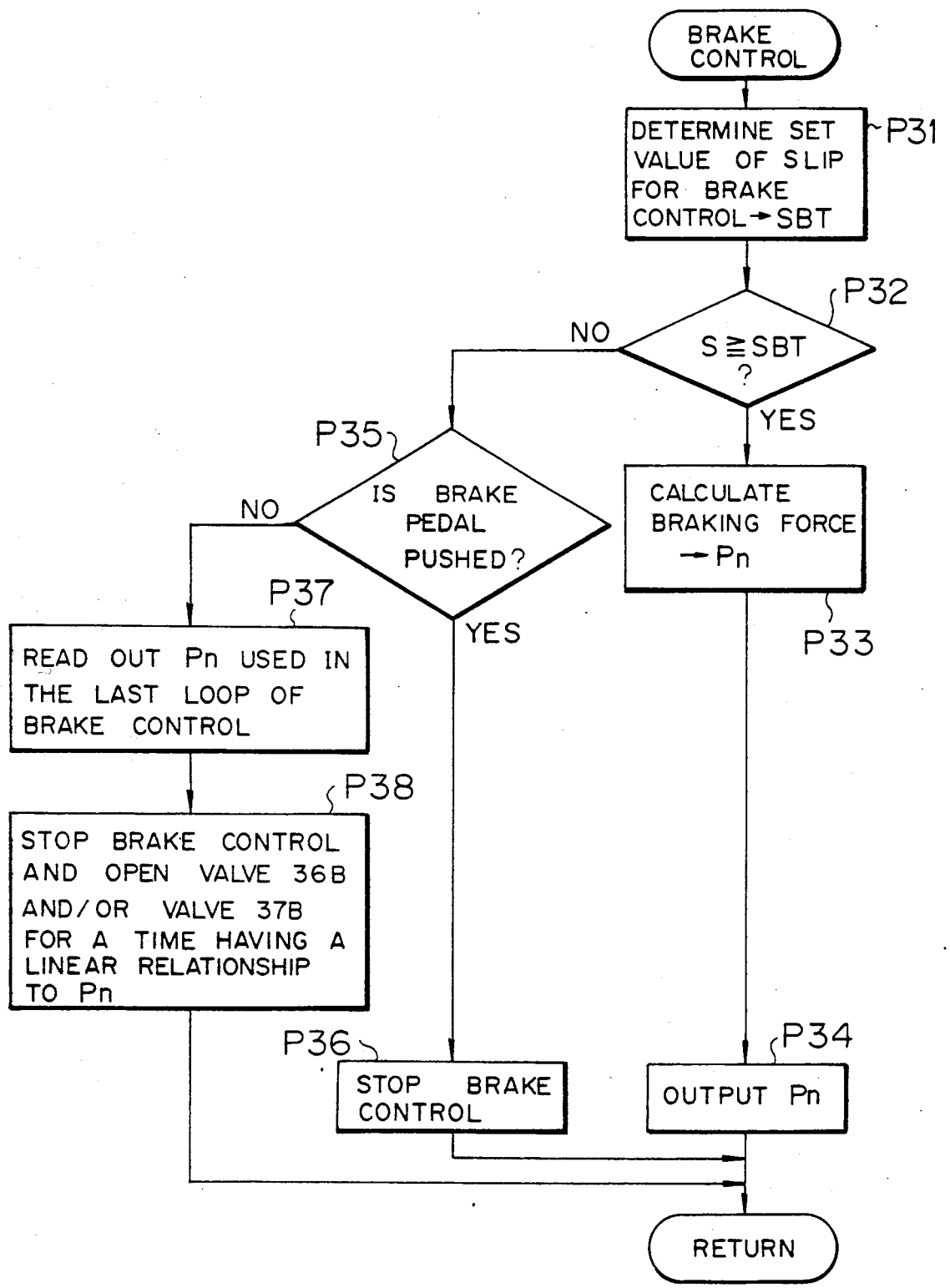
Figure 5A:
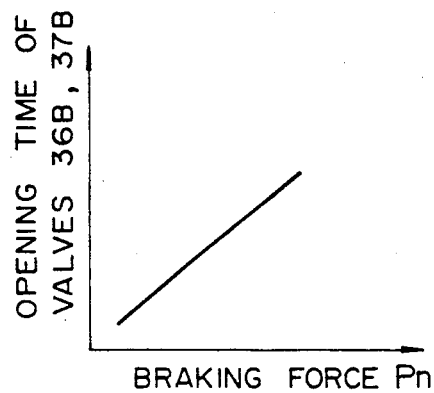
FIG. 5a is a diagram for determining the relation between the opening time of pressure reducing valve means and the braking force.

The contents of the brake control will be described with reference to FIGS. 5 and 5a.

First, as will be described later, the set value of slip SBT used in the brake control, is determined (P31), then it is judged whether the slip value S of the driving wheel is larger than or equal to SBT or not (P32). If the slip value S of the driving wheel is larger than or equal to SBT, the braking force Pn necessary for reducing the slip value to SBT (or opening of the valves 36A, 36B, 37A, 38B) is determined (P33), then control signals are provided for the valves in response to the determined braking force Pn (P34). If the slip value S of the driving wheel is smaller than SBT, the slip control by the brake control is ended in the following way. First, it is judged whether the brake pedal 25 is being pushed or not based on the brake signal from the brake switch 71 (P35). If the brake pedal 25 is being pushed, the slip control by the brake control is ended (P36), that is the valves 32, 36B, 37B are closed and the valves 34, 36A, 37A are opened, as shown in FIG. 1. Thus, the ordinary brake operation becomes possible. If the brake pedal 25 is not being pushed, which means that the driver does not want to decrease the speed of the car, the slip control by the brake control is ended, and further, the hydraulic pressure provided to the brake cylinder 22RL and/or the brake cylinder 22RR during the slip control is rapidly reduced. More specifically, the braking force Pn which was used in the last loop of the brake control is read out of RAM (P37), then the valves 32, 36B, 37B are closed and the valves 34, 36A, 37A are opened as described above, and at the same time, the valve 36B and/or the valve 37B is opened for a time having a linear relationship to Pn, as shown in FIG. 5a (P38). Thus, the hydraulic pressure provided to the brake cylinders of the driving wheels is rapidly reduced, and thus the ordinary brake operation becomes possible.

③ Engine Control

Figure 6:
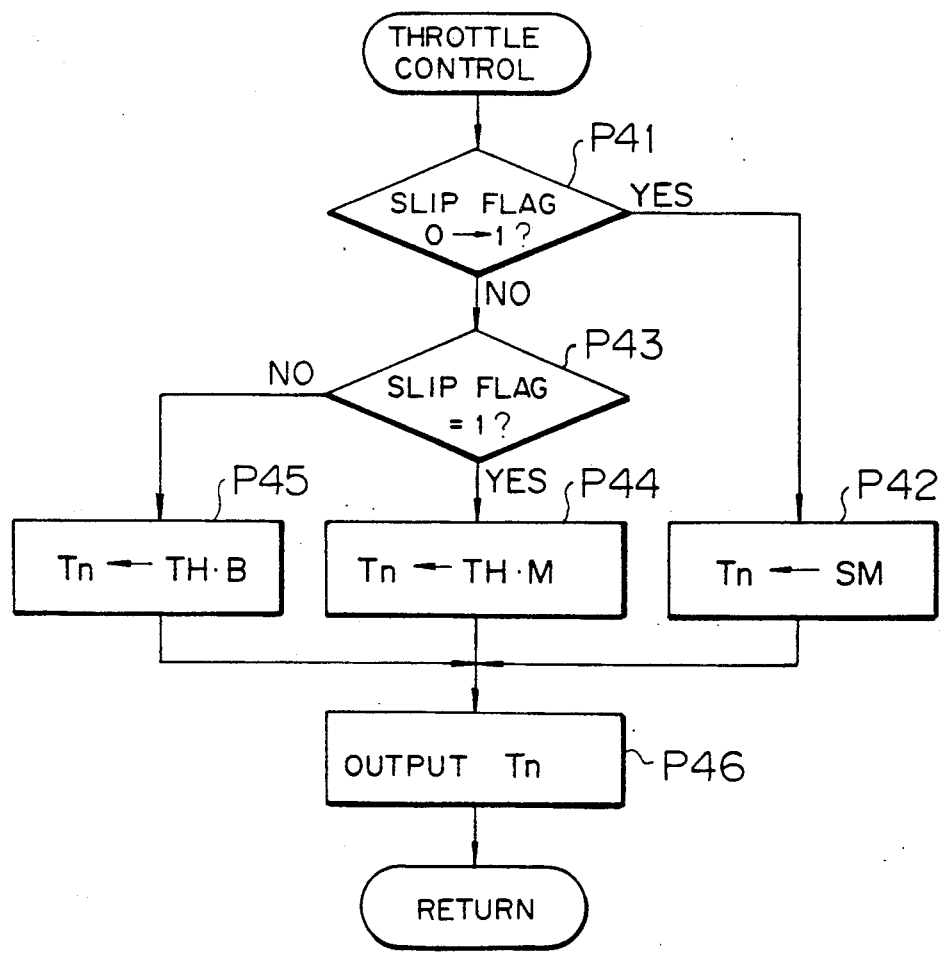

The contents of the engine control will be described with reference to FIG. 6.

Figure 4:
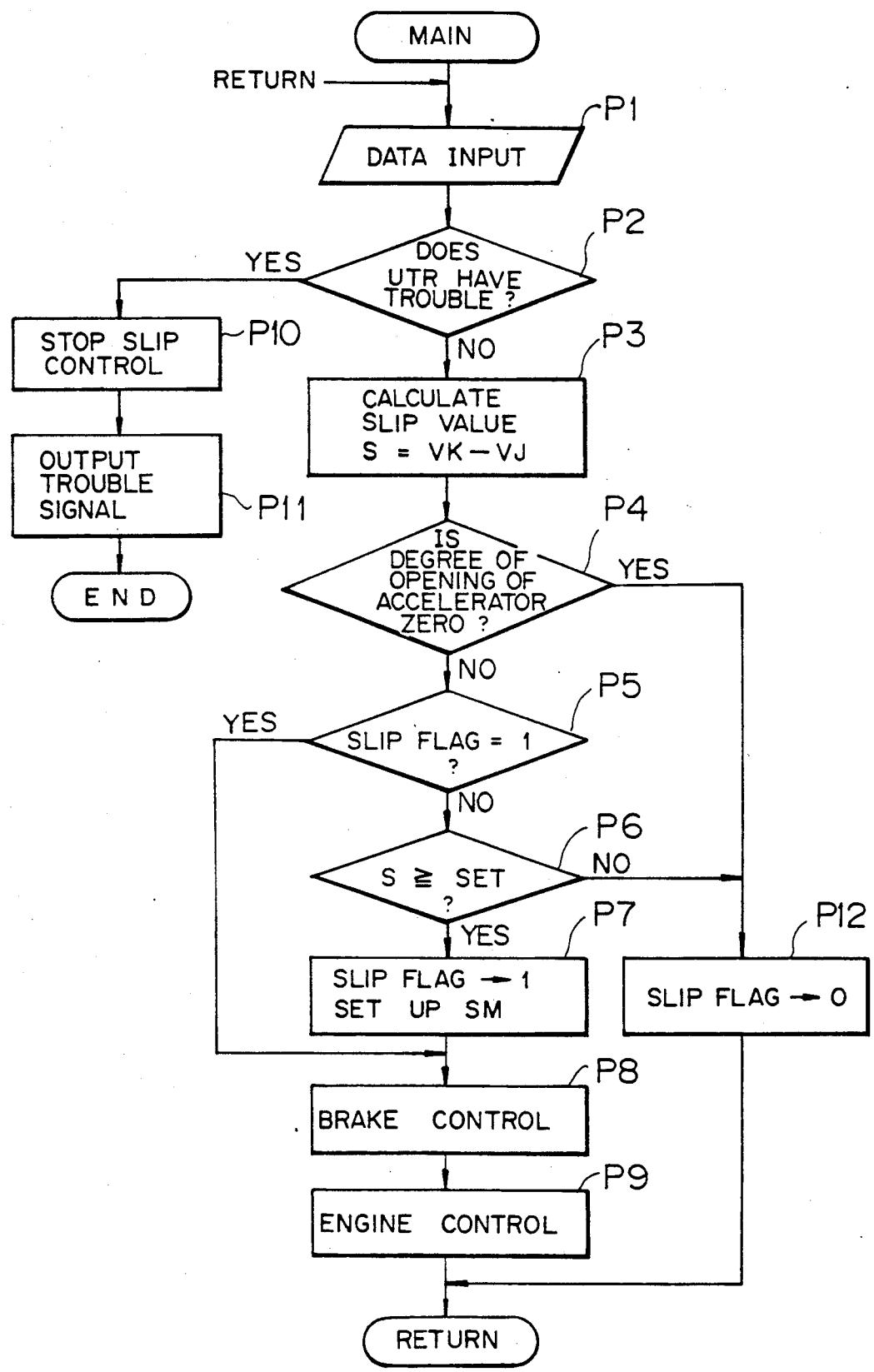
FIGS. 4, 5, 6 are flowcharts showing the slip control in accordance with the present invention.

The engine control is carried out by braking into the main control shown in FIG. 4 at predetermined time intervals. First, it is judged whether the time is $t_1$ shown in FIG. 3 or not (P41). If the time is $t_1$ shown in FIG. 3, the throttle opening Tn is set to be the lower limit value SM which is determined in a way to be described later (P42).

If the time is not $t_1$ shown in FIG. 3, it is judged whether the slip control is being carried out or not (P43). If the slip control is being carried out, the throttle opening Tn is set to be TH·M (P44). If the slip control is not being carried out, the throttle opening Tn is set to be TH·B (P45), that is the throttle opening Tn is controlled depending on the accelerator opening, in accordance with a standard throttle opening diagram shown in FIG. 9.

After the control steps described above, the motor 106 is driven so as to achieve the set value Tn of the throttle opening (P46).

Set Values of Slip, SET, SBT for Slip Control and the Lower Limit SM of the Throttle Opening The determination of the set values SET, SBT for engine control, brake control and the lower limit SM of the throttle opening will be described hereinbefore.

Figure 7:
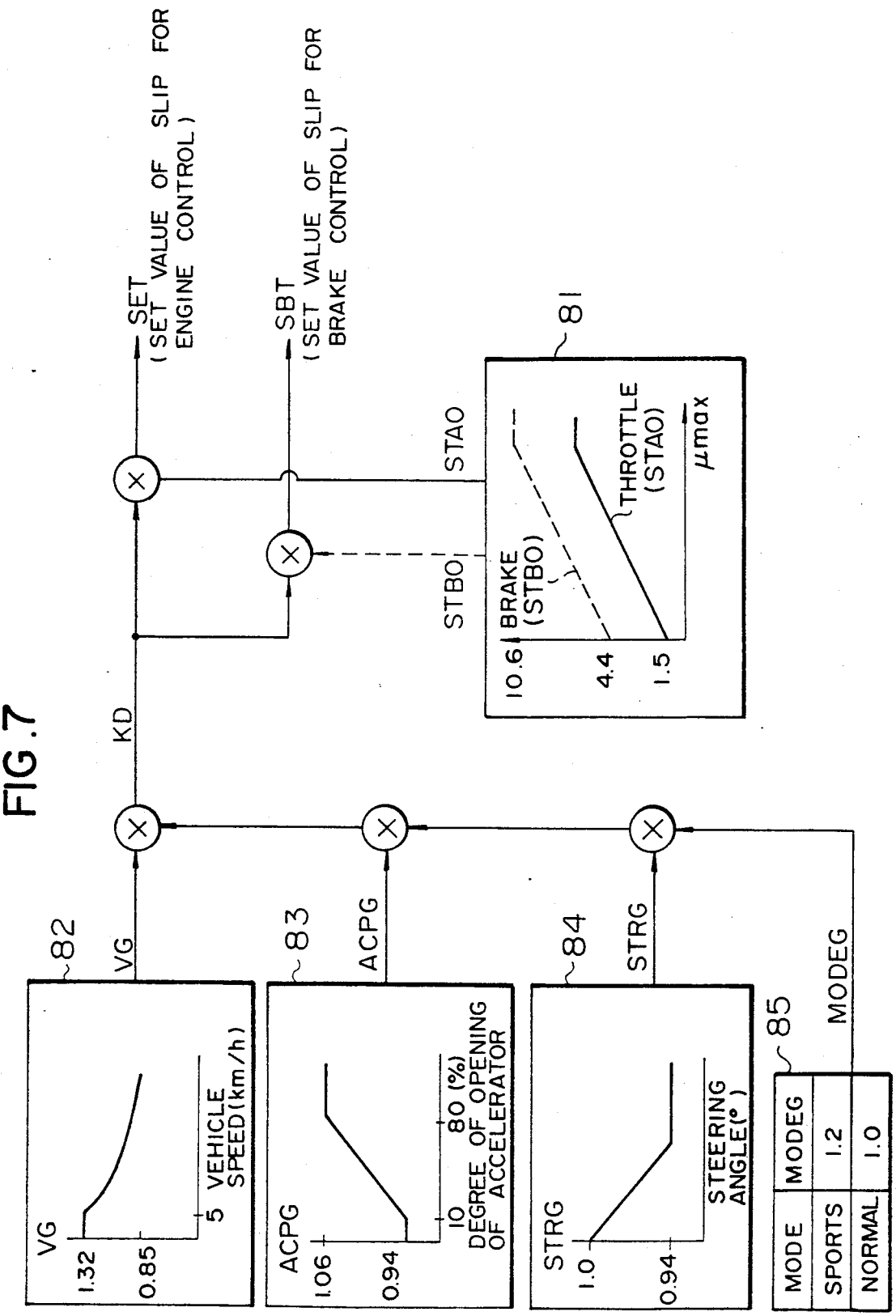
FIG. 7 is a circuit diagram for determining set values of the slip.

FIG. 7 is a block diagram showing the procedure for determining the set values SET, SBT. The set values SET, SBT are determined based on the parameters such as vehicle speed, accelerator opening, steering angle, position of the mode switch 70 and the maximum road friction coefficient $\mu$max. As shown in FIG. 7, standard values STAO, STBO of the set value SET, SBT are given by a map 81 as functions of the maximum road friction coefficient $\mu$max. The standard value STBO is set larger than the standard value STAO. The set values SET, SBT are respectively obtained by multiplying the standard values STAO, STBO by the correction gain KD.

The correction gain KD is obtained by multiplying gain coefficient VG by gain coefficients ACPG, STRG, MODEG. The gain coefficient VG is given by a map 82 as a function of the vehicle speed. The gain coefficient ACPG is given by a map 83 as a function of the accelerator opening. The gain coefficient STRG is given by a map 84 as a function of the steering angle. The gain coefficient MODEG is given by a table 85 and is manually selected by the driver. As shown in FIG. 7, two modes, i.e. sports mode and normal mode, are set in the table 85.

Figure 8:
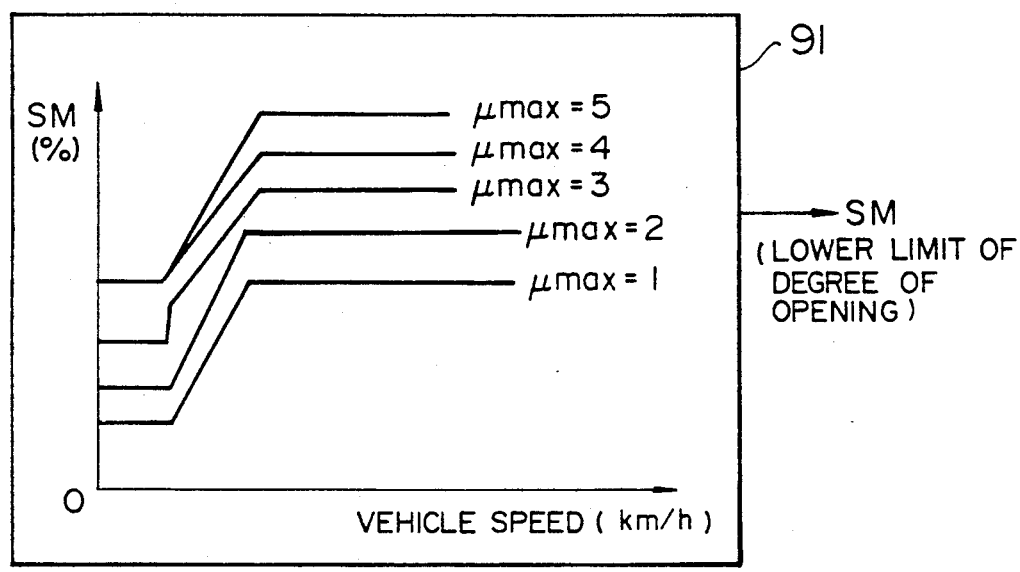
FIG. 8 is a map for determining the lower limit of the degree of the throttle opening in the slip control.

As shown in FIG. 8, the lower limit SM of the accelerator opening is given by a map 91 as a function of the vehicle speed and the maximum road friction coefficient $\mu$max. In FIG. 8, the maximum road friction coefficient $\mu$max is smallest when it is equal to 1 and is largest when it is equal to 5.

The maximum road friction coefficient $\mu$max may be manually set by the driver, but may also be estimated in a way as described below. That is the maximum road friction coefficient $\mu$max may be estimated based on an acceleration obtained by subtracting the rotation speed of the driven wheels at a predetermined time period after the time $t_1$ from the rotation speed of the driven wheels at the time $t_1$, or the maximum road friction coefficient $\mu$max may be estimated based on the maximum accleration in the last slip control.

We claim:

1. A slip control mechanism of a car comprising:
   hydraulic booster means for driving master cylinder means for providing hydraulic pressure to first brake means provided for each driven wheel;
   second brake means provided for each driving wheel;
   slip detection means for detecting slip of driving wheels;
   slip control means for operating the second brake means, based on signals from the slip detecting means, by using the operating oil of the hydraulic booster means as operating oil of the second brake means so as to reduce the slip of the driving wheels, said control means comprising pressure control valve means for controlling hydraulic pressure of the operating oil of the second brake means, including pressure reducing valve means for reducing the hydraulic pressure of the operating oil of the second brake means;
   detection means for detecting completion of the slip control by the operation of the second brake means; and,
   release means for opening the pressure reducing valve means for a predetermined time so as to release the operating oil of the second brake means on the occasion of the completion of the slip control by the operation of the second brake means.

2. A slip control mechanism of a car in accordance with claim 1 wherein:
   said pressure reducing valve means comprises outlet valve means of an antilock brake system of the car.

3. A slip control mechanism of a car in accordance with claim 1 wherein:
   said detecting means for detecting completion of the slip control comprises a brake switch which is turned on when a brake pedal is pushed.

4. A slip control mechanism of a car in accordance with claim 1 wherein:
   said release means has braking force detecting means for detecting a braking force acting on the driving wheels, and has time control means for allowing said predetermined time to have a linear relationship to the magnitude of the braking force acting on the driving wheels.

5. A slip control mechanism of a car in accordance with claim 4 wherein:
   said pressure control valve means has closing value means for restricting the supply of the operating oil to the second braking means; and,
   said pressure reducing valve means is disposed between the closing valve means and the second brake means.

6. A slip control mechanism of a car in accordance with claim 5 wherein:
   said pressure control valve means is provided for each driving wheel.

7. A slip control mechanism of a car comprising:
   hydraulic booster means for driving master cylinder means for providing hydraulic pressure to first brake means provided for each driven wheel;
   second brake means provided for each driving wheel;
   slip detection means for detecting slip of the driving wheels;
   first slip control means for operating the second brake means, based on signals from the slip detecting means, by using the operating oil of the hydraulic booster means as operating oil of the second brake means so as to reduce the slip of the driving wheels, said control means comprising pressure control valve means for controlling hydraulic pressure of the operating oil of the second brake means, including pressure reducing valve means for reducing the hydraulic pressure of the operating oil of the second brake means;
   detection means for detecting completion of the slip control by the operation of the second brake means;
   release means for opening the pressure reducing valve means for a predetermined time so as to release the operating oil of the second brake means on the occasion of the completion of the slip control by the operation of the second brake means; and,
   second slip control means for decreasing output torque of an engine of the car, based on the signals from the slip detecting means, by decreasing throttle opening of the engine so as to reduce the slip of the driving wheels.

* * * * *